(12) United States Patent
Nakano et al.

(10) Patent No.: US 11,424,478 B2
(45) Date of Patent: Aug. 23, 2022

(54) SOLID BATTERY

(71) Applicant: Murata Manufacturing Co., Ltd., Nagaokakyo (JP)

(72) Inventors: Koichi Nakano, Nagaokakyo (JP); Sumito Shiina, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 251 days.

(21) Appl. No.: 16/924,594

(22) Filed: Jul. 9, 2020

(65) Prior Publication Data
US 2020/0350614 A1 Nov. 5, 2020

Related U.S. Application Data

(63) Continuation of application No. PCT/JP2019/006055, filed on Feb. 19, 2019.

(30) Foreign Application Priority Data

Feb. 23, 2018 (JP) .............................. JP2018-030641

(51) Int. Cl.
*H01M 10/056* (2010.01)
*H01M 4/36* (2006.01)
(Continued)

(52) U.S. Cl.
CPC ......... *H01M 10/056* (2013.01); *H01M 4/366* (2013.01); *H01M 4/66* (2013.01);
(Continued)

(58) Field of Classification Search
None
See application file for complete search history.

(56) References Cited

U.S. PATENT DOCUMENTS

2003/0232248 A1 12/2003 Iwamoto et al.
2007/0048617 A1 3/2007 Inda
(Continued)

FOREIGN PATENT DOCUMENTS

JP 2015053295 A 3/2015
JP 2015069775 A 4/2015
(Continued)

OTHER PUBLICATIONS

Japanese Office Action issued for Japanese Application No. 2020-501773, date of Japanese Office Action dated Sep. 28, 2021.
(Continued)

*Primary Examiner* — Helen Oi K Conley
(74) *Attorney, Agent, or Firm* — ArentFox Schiff LLP

(57) ABSTRACT

A solid battery that includes a positive electrode terminal, a negative electrode terminal spaced apart from the positive electrode terminal, a positive electrode layer electrically connected to the positive electrode terminal, a negative electrode layer electrically connected to the negative electrode terminal, a first solid electrolyte layer between the positive electrode layer and the negative electrode layer and containing a first solid electrolyte, and a second solid electrolyte layer between the positive electrode layer and the
(Continued)

negative electrode terminal or between the negative electrode layer and the positive electrode terminal, and containing a second solid electrolyte having a glass transition temperature lower than a crystallization temperature of the first solid electrolyte and having a crystallization temperature equal to or higher than a glass transition temperature of the first solid electrolyte, and the second solid electrolyte layer having an ion conductivity lower than that of the first solid electrolyte layer.

15 Claims, 5 Drawing Sheets

(51) Int. Cl.
  *H01M 4/66* (2006.01)
  *H01M 10/0585* (2010.01)
  *H01M 4/02* (2006.01)

(52) U.S. Cl.
  CPC .. *H01M 10/0585* (2013.01); *H01M 2004/027* (2013.01); *H01M 2004/028* (2013.01); *H01M 2300/0065* (2013.01)

(56) References Cited

U.S. PATENT DOCUMENTS

| | | |
|---|---|---|
| 2013/0149593 A1 | 6/2013 | Hayashi et al. |
| 2015/0064537 A1 | 3/2015 | Christensen et al. |

FOREIGN PATENT DOCUMENTS

| | | |
|---|---|---|
| JP | 2015220099 A | 12/2015 |
| JP | 2016001601 A | 1/2016 |
| JP | 2016207540 A | 12/2016 |
| WO | 2012020699 A1 | 2/2012 |
| WO | 2013038880 A1 | 3/2013 |

OTHER PUBLICATIONS

Kun, He et al.; "Influence of $Al_2O_3$ additions on crystallization mechanism and conductivity of $Li_2O$—$Ge_2O$—$P_2O_5$ glass ceramics"; Physica B, Elsevier, Jul. 27, 2011, vol. 406, Issue 20, pp. 3947-3950.

EP Office Action and Extended European Search Report issued for EP Application No. 19 75 7260, dated Oct. 26, 2021.

International Search Report Issued for PCT/JP2019/006055, dated Apr. 9, 2019.

Written Opinion of the International Searching Authority issued for PCT/JP2019/006055, dated Apr. 9, 2019.

SOLID BATTERY

CROSS REFERENCE TO RELATED APPLICATIONS

The present application is a continuation of International application No. PCT/JP2019/006055, filed Feb. 19, 2019, which claims priority to Japanese Patent Application No. 2018-030641, filed Feb. 23, 2018, the entire contents of each of which are incorporated herein by reference.

FIELD OF THE INVENTION

The present technology relates to a solid battery including a solid electrolyte layer together with a positive electrode layer and a negative electrode layer.

BACKGROUND OF THE INVENTION

Various electronic apparatuses such as mobile phones have been widely used, and there has been a demand to reduce the sizes and weights of these electronic apparatuses as well as to achieve a long life. Thus, as an electric power source, a battery that can be charged and discharged has been actively developed.

As a battery, a solid-state battery (solid battery) using an electrolyte in a solid state (solid electrolyte) has been attracting attention instead of a liquid-state battery using an electrolyte in a liquid state (electrolyte solution). This is because in the solid battery, liquid leakage peculiar to the liquid-state battery does not occur.

This solid battery includes a solid electrolyte layer containing a solid electrolyte together with a positive electrode layer and a negative electrode layer. Since the configuration of the solid battery exerts a large influence on battery characteristics, various studies have been made on the configuration of the solid battery.

Specifically, an inkjet printing method has been used to manufacture a solid battery in which a positive electrode layer and a negative electrode layer are alternately stacked with a solid electrolyte layer interposed therebetween (see, for example, Patent Document 1). In this solid battery, while the positive electrode layer is adjacent to a positive electrode terminal, the positive electrode layer is spaced apart from a negative electrode terminal, and while the negative electrode layer is adjacent to the negative electrode terminal, the negative electrode layer is spaced apart from the positive electrode terminal.

Patent Document 1: Japanese Patent Application Laid-Open No. 2016-207540

SUMMARY OF THE INVENTION

Although various studies have been made on a configuration of the solid battery, there is room for improvement because battery characteristics of the solid battery are not yet sufficient.

The present technology has been made in consideration of the above described issues, and an object thereof is to provide a solid battery with improved battery characteristics.

A solid battery according to one embodiment of the present technology includes a positive electrode terminal, a negative electrode terminal spaced apart from the positive electrode terminal, a positive electrode layer between the positive electrode terminal and the negative electrode terminal and electrically connected to the positive electrode terminal and spaced apart from the negative electrode terminal, a negative electrode layer between the positive electrode terminal and the negative electrode terminal and spaced apart from the positive electrode terminal and electrically connected to the negative electrode terminal, a first solid electrolyte layer between the positive electrode layer and the negative electrode layer and containing a first solid electrolyte, and a second solid electrolyte layer between at least one of (1) the positive electrode layer and the negative electrode terminal and (2) the negative electrode layer and the positive electrode terminal, the second solid electrolyte layer containing a second solid electrolyte having a glass transition temperature lower than a crystallization temperature of the first solid electrolyte and having a crystallization temperature equal to or higher than a glass transition temperature of the first solid electrolyte, and the second solid electrolyte layer having an ion conductivity lower than an ion conductivity of the first solid electrolyte layer.

According to the solid battery of one embodiment of the present technology, while the glass transition temperature of the second solid electrolyte is lower than the crystallization temperature of the first solid electrolyte, the crystallization temperature of the second solid electrolyte is equal to or higher than the glass transition temperature of the first solid electrolyte, and the ion conductivity of the second solid electrolyte layer is lower than the ion conductivity of the first solid electrolyte layer, so that the battery characteristics can be improved.

The effect of the present technology is not necessarily limited to the effect herein described and may be any of a series of effects related to the present technology described later.

DETAILED DESCRIPTION OF THE INVENTION

An embodiment of the present technology will be described in detail below referring to the accompanying drawings. It is to be noted that the description will be given in the following order.

1. Solid Battery
1-1. Configuration
1-2. Face-to-face Relationship Between Positive Electrode Layer and Negative Electrode Layer
1-3. Operation
1-4. Manufacturing Method
1-5. Operation and Effects
2. Modified Example
3. Applications of Solid Battery 1. Solid Battery A solid battery of a preferred embodiment of the present technology is described herein.

The solid battery described herein is a battery using a solid electrolyte, and in the solid battery, a battery capacity is obtained by utilizing an absorption phenomenon of an electrode reactant and a release phenomenon of the electrode reactant.

The electrode reactant is a substance (ion) involved in an electrode reaction (so-called charge/discharge reaction). The type of electrode reactant is not particularly limited, and is, for example, an alkali metal or the like. Hereinafter, for example, a case where the electrode reactant is lithium (Li) will be described.

1-1. Configuration

First, a configuration of the solid battery will be described.

Figure 1:
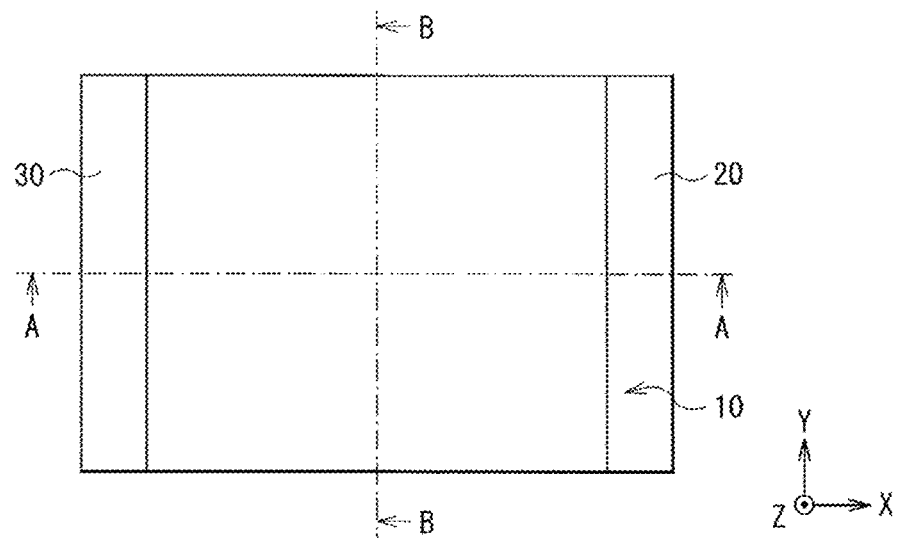
FIG. 1 is a plan view illustrating a configuration of a solid battery according to an embodiment of the present technology.
Figure 2:
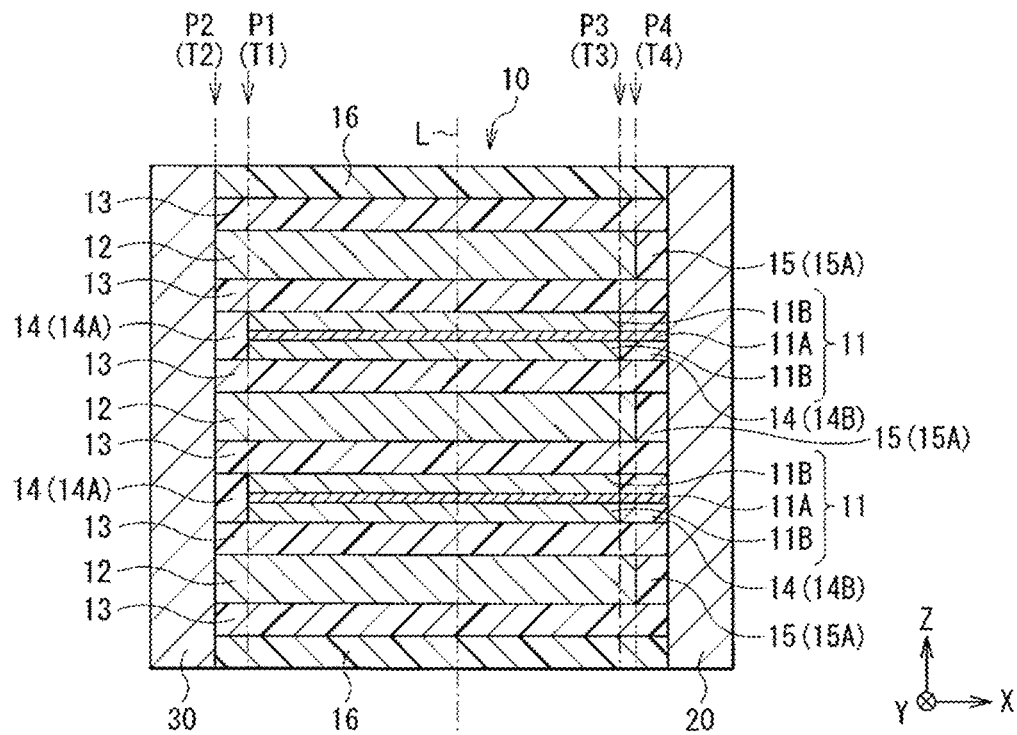
FIG. 2 is a cross-sectional view showing a configuration of the solid battery taken along the line A-A shown in FIG. 1.

FIG. 1 shows a planar configuration of the solid battery. FIG. 2 shows a sectional configuration of the solid battery taken along the line A-A shown in FIG. 1, and FIG. 3 shows a sectional configuration of the solid battery taken along the line B-B shown in FIG. 1.

Figure 3:
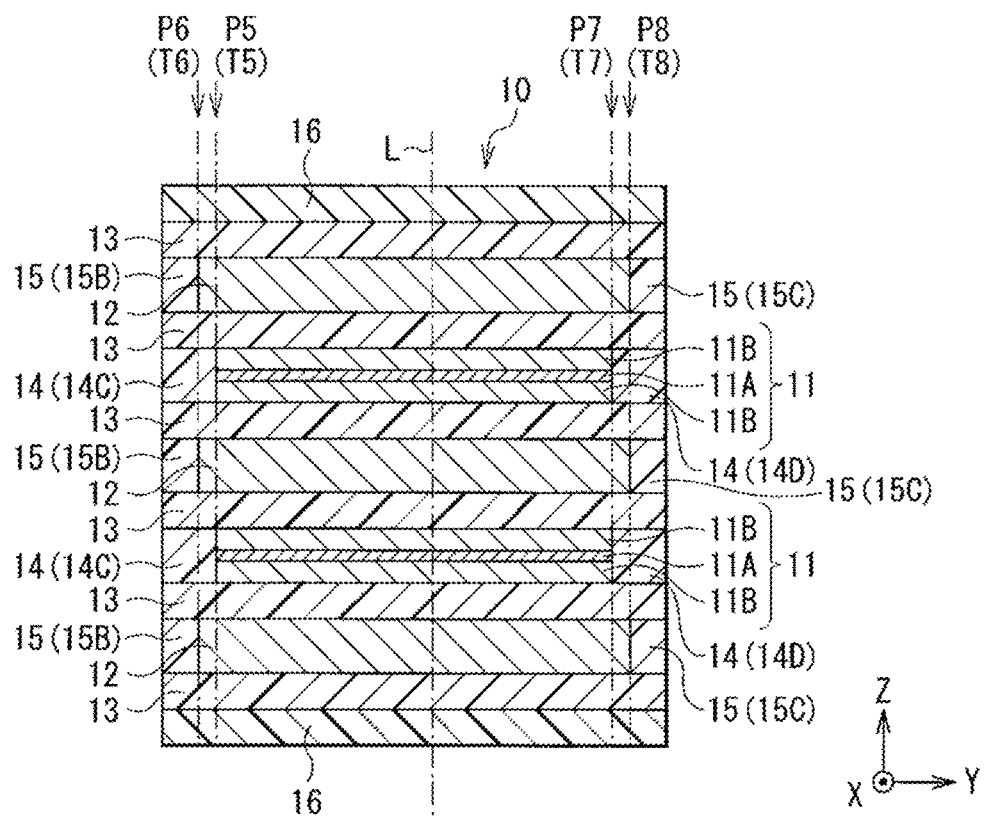
FIG. 3 is a sectional view showing a configuration of the solid battery taken along the line B-B shown in FIG. 1.
Figure 4:
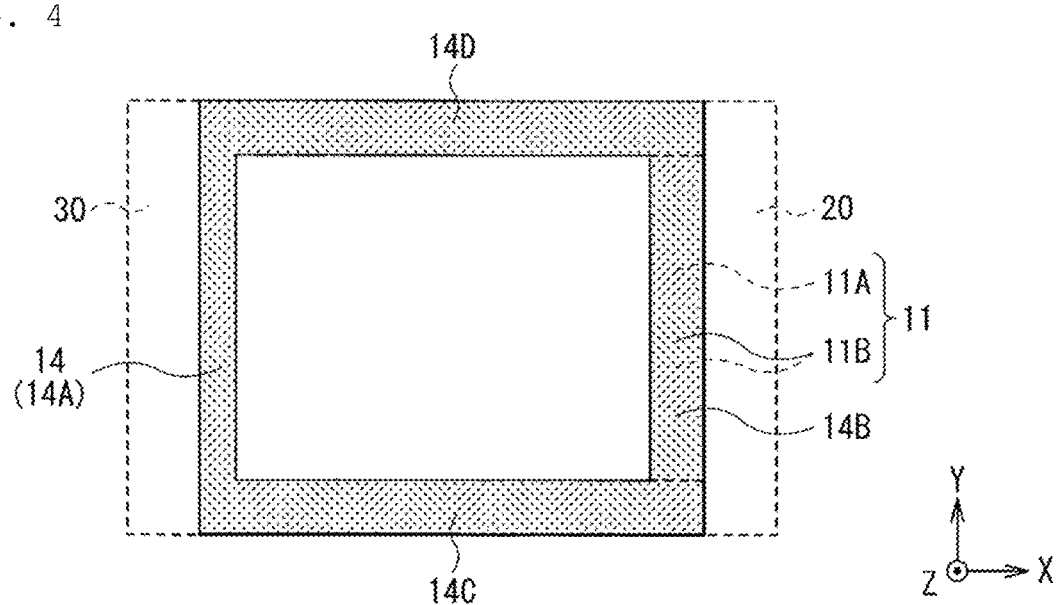
FIG. 4 is a plan view showing respective configurations of a positive electrode layer and a positive electrode separation layer shown in FIGS. 2 and 3.
Figure 5:
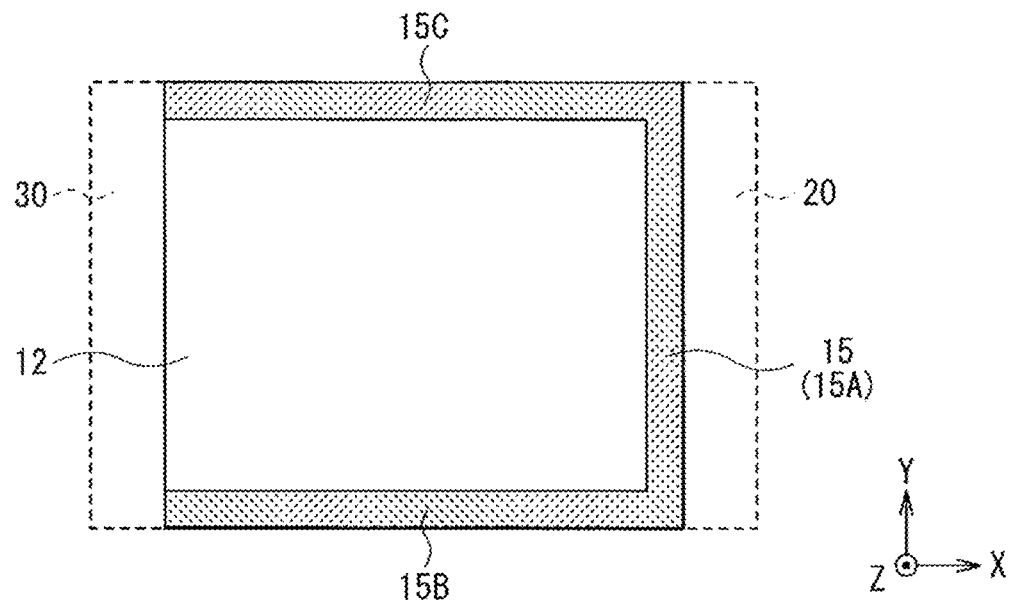
FIG. 5 is a plan view showing respective configurations of a negative electrode layer and a negative electrode separation layer shown in FIGS. 2 and 3.

FIG. 4 shows respective planar configurations of a positive electrode layer 11 and a positive electrode separation layer 14 shown in FIGS. 2 and 3 and corresponds to FIG. 1. FIG. 5 shows respective planar configurations of a negative electrode layer 12 and a negative electrode separation layer 15 shown in FIGS. 2 and 3 and corresponds to FIG. 1. However, in FIGS. 4 and 5, in order to facilitate understanding of a connection relationship between the positive electrode layer 11 and a positive electrode terminal 20 and a connection relationship between the negative electrode layer 12 and a negative electrode terminal 30, the positive electrode terminal 20 and the negative electrode terminal 30 are also each shown by broken lines.

The solid battery includes, for example, as shown in FIGS. 1 to 3, a laminate 10, and the positive electrode terminal 20 and the negative electrode terminal 30 attached to the laminate 10.

(Laminate)

The laminate 10 is disposed between the positive electrode terminal 20 and the negative electrode terminal 30, and includes a plurality of layers stacked in a direction (Z-axis direction) intersecting a direction (X-axis direction) in which the positive electrode terminal 20 and the negative electrode terminal 30 face each other. That is, the laminate 10 includes, for example, the positive electrode layer 11, the negative electrode layer 12, the solid electrolyte layer 13, the positive electrode separation layer 14, the negative electrode separation layer 15, and the protective layer 16. Here, the solid electrolyte layer 13 is a "first solid electrolyte layer" of one embodiment of the present technology.

Specifically, the laminate 10 has, for example, a structure in which a protective layer 16, the positive electrode layer 11, the negative electrode layer 12, the solid electrolyte layer 13, and the protective layer 16 are stacked in this order in the Z-axis direction. That is, the positive electrode layer 11, the negative electrode layer 12, and the solid electrolyte layer 13 are arranged, for example, between a pair of the protective layers 16.

However, the positive electrode layer 11 and the negative electrode layer 12 are alternately stacked with the solid electrolyte layer 13 interposed therebetween such that the uppermost layer and the lowermost layer are the solid electrolyte layers 13 in the Z-axis direction. Here, for example, the negative electrode layer 12 is adjacent to the uppermost solid electrolyte layer 13, and the negative electrode layer 12 is adjacent to the lowermost solid electrolyte layer 13. Consequently, since the solid electrolyte layer 13 is interposed between the positive electrode layer 11 and the negative electrode layer 12, the positive electrode layer 11 and the negative electrode layer 2 are spaced apart from each other with the solid electrolyte layer 13 interposed therebetween.

In the same layer as the positive electrode layer 11, for example, a positive electrode separation layer 14 is provided around the positive electrode layer 11. On the other hand, in the same layer as the negative electrode layer 12, for example, a negative electrode separation layer 15 is provided around the negative electrode layer 12.

The number of stacked layers of the laminate 10 is not particularly limited. That is, the numbers of the positive electrode layers 11, the negative electrode layers 12, and the solid electrolyte layers 13 are not particularly limited. In FIGS. 2 and 3, for example, in order to simplify the illustration, a case where the number of the positive electrode layers 11 is 2, the number of the negative electrode layers 12 is 3, and the number of the solid electrolyte layers 13 is 6 is shown.

(Positive Electrode Layer)

The positive electrode layer 11 serves as one electrode capable of absorbing and releasing lithium ions. Since the positive electrode layer 11 is adjacent to the positive electrode terminal 20 and is spaced apart from the negative electrode terminal 30, the positive electrode layer 11 is electrically connected to the positive electrode terminal 20 and electrically separated from the negative electrode terminal 30.

Specifically, the positive electrode layer 11 has, for example, a structure in which a positive electrode current collector layer 11A and a positive electrode active material layer 11B are stacked in the Z-axis direction. Here, for example, since one positive electrode current collector layer 11A is interposed between the two positive electrode active material layers 11B, the positive electrode layer 11 has, for example, a three-layer structure in which the positive electrode active material layer 11B, the positive electrode current collector layer 11A, and the positive electrode active material layer 11B are stacked in this order in the Z-axis direction.

The positive electrode current collector layer 11A contains, for example, one or two or more conductive materials. The positive electrode current collector layer 11A may be configured of, for example, a single layer or multiple layers. However, the positive electrode current collector layer 11A may, for example, contain, together with a conductive material, one or two or more of a binder (positive electrode current collector binder), a solid electrolyte (positive electrode current collector solid electrolyte), and the like.

The conductive material is, for example, a carbon material, a metal material, or the like. Specifically, the carbon material is, for example, graphite, carbon nanotube, or the like. The metal material is, for example, copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), palladium (Pd), or the like, and may be an alloy formed of two or more kinds thereof. The details regarding each of the positive electrode current collector binder and the positive electrode current collector solid electrolyte are, for example, similar to the details regarding each of a positive electrode binder and a main solid electrolyte described later.

The positive electrode active material layer 11B contains one or two or more of active materials (positive electrode active materials) capable of absorbing and releasing lithium ions and faces the negative electrode layer 12 with the solid electrolyte layer 13 interposed therebetween. The positive electrode active material layer 11B may be configured of, for example, a single layer or multiple layers. However, positive electrode active material layer 11B may, for example, contain, together with a positive electrode active material, one or two or more of a binder (positive electrode binder), a conductive agent (positive electrode conductive agent), a solid electrolyte (positive electrode solid electrolyte), and the like.

The positive electrode active material is, for example, a lithium-containing compound. The kind of the lithium compound is not particularly limited, and is, for example, a lithium transition metal composite oxide and a lithium transition metal phosphate compound. The lithium transition metal composite oxide is a generic term for oxides containing lithium and one or two or more transition metal elements as constituent elements, and the lithium transition metal phosphate compound is a generic term for phosphoric acid compounds containing lithium and one or two or more transition metal elements as constituent elements. The type of transition metal element is not particularly limited and is, for example, cobalt, nickel, manganese (Mn), or iron, or the like.

The lithium transition metal composite oxide is, for example, a compound represented by each of $Li_xM1O_2$ and $Li_yM2O_4$. The lithium transition metal phosphate compound is, for example, a compound represented by $Li_zM3PO_4$. However, each of M1, M2, and M3 is one kind or two or more kinds of transition metal elements. The respective values of x, y and z are arbitrary.

Specifically, the lithium transition metal composite oxide is, for example, $LiCoO_2$, $LiNiO_2$, $LiVO_2$, $LiCrO_2$, $LiMn_2O_4$ or the like. The lithium transition metal phosphate compound is, for example, $LiFePO_4$, or $LiCoPO_4$.

Here, between the positive electrode layer 11 and the negative electrode terminal 30, for example, a portion of the positive electrode separation layer 14 (separation portion 14A described later) is interposed. Thus, as described above, the positive electrode layer 11 is spaced apart from the negative electrode terminal 30 with the positive electrode separation layer 14 (separation portion 14A) interposed therebetween. Since the positive electrode layer 11 extends to the positive electrode terminal 20, as described above, the positive electrode layer 11 is adjacent to the positive electrode terminal 20.

The positive electrode binder is, for example, one or two or more of synthetic rubber, polymer materials, and the like. Specifically, the synthetic rubber is, for example, styrene-butadiene-based rubber, fluorine-based rubber, ethylene propylene diene, or the like. The polymer material is, for example, polyvinylidene fluoride, polyimide, acrylic resin, or the like.

The positive electrode conductive agent is, for example, one or two or more of a carbon material, a metal oxide, a conductive polymer, and the like. Specifically, the carbon material is, for example, graphite, carbon black, acetylene black, ketjen black, carbon fiber, or the like. The metal oxide is, for example, tin oxide or the like. The conductive polymer is, for example, sulfur, polyaniline, polythiophene, or the like.

The positive electrode active material layer 11B may contain, for example, the positive electrode solid electrolyte as described above. The details regarding the positive electrode solid electrolyte are, for example, similar to the details regarding the main solid electrolyte described later.

(Negative Electrode Layer)

The negative electrode layer 12 serves as the other electrode capable of absorbing and releasing lithium ions and faces the positive electrode layer 11. Since the negative electrode layer 12 is spaced apart from the positive electrode terminal 20 and is adjacent to the negative electrode terminal 30, the negative electrode layer 12 is electrically separated from the positive electrode terminal 20 and electrically connected to the negative electrode terminal 30.

Specifically, the negative electrode layer 12 contains one or two or more active materials (negative electrode active materials) capable of absorbing and releasing lithium ions. The negative electrode layer 12 may be configured of, for example, a single layer or multiple layers. However, the negative electrode layer 12 may, for example, contain, together with a negative electrode active material, one or two or more of a binder (negative electrode binder), a conductive agent (negative electrode conductive agent), a solid electrolyte (negative electrode solid electrolyte), and the like. The details regarding each of the negative electrode binder and the negative electrode conductive agent are, for example, similar to the details regarding each of the positive electrode binder and the positive electrode conductive agent.

The negative electrode active material is, for example, a carbon material, a metal-based material, a lithium-containing compound, or the like.

Specifically, the carbon material is, for example, graphite, easily graphitizable carbon, non-graphitizable carbon, a mesocarbon microbead (MCMB), highly oriented graphite (HOPG), or the like.

The metal-based material is a generic term for a material containing one or two or more metal elements and metalloid elements capable of forming lithium and alloy as constituent elements. The metal-based material may be a simple substance, an alloy, a compound. Since purity of the simple substance described here is not necessarily limited to 100%, the simple substance may contain a trace amount of impurities.

The metal element and the metalloid element are each, for example, silicon (Si), tin (Sn), aluminum (Al), indium, magnesium, boron (B), gallium (Ga), germanium (Ge), lead (Pb), bismuth (Bi), cadmium (Cd), silver, zinc, hafnium (Hf) zirconium (Zr), yttrium (Y), palladium, platinum, or the like.

Specifically, the metal-based material is, for example, Si, Sn, $SiB_4$, $TiSi_2$, SiC, $Si_3N_4$, $SiO_v$ (0<v≤2), LiSiO, $SnO_w$ (0<w≤2), $SnSiO_3$, LiSnO, $Mg_2Sn$, or the like.

The lithium-containing compound is, for example, a lithium transition metal composite oxide or the like. The definition regarding the lithium transition metal composite oxide is as described above. Specifically, the lithium transition metal composite oxide is, for example, $Li_4Ti_5O_{12}$ or the like.

Here, between the negative electrode layer 12 and the positive electrode terminal 20, for example, a portion of the negative electrode separation layer 15 (separation portion 15A described later) is interposed. Thus, as described above, the negative electrode layer 12 is spaced apart from the positive electrode terminal 20 with the negative electrode separation layer 15 (separation portion 15A) interposed therebetween. Since the negative electrode layer 12 extends to the negative electrode terminal 30, the negative electrode layer 12 is adjacent to the negative electrode terminal 30 as described above.

The negative electrode layer 12 may contain, for example, the negative electrode solid electrolyte as described above. The details regarding the negative electrode solid electrolyte are, for example, similar to the details regarding the main solid electrolyte described later.

(Solid Electrolyte Layer)

The solid electrolyte layer 13 is a medium for moving lithium ions between the positive electrode layer 11 and the negative electrode layer 12. The solid electrolyte layer 13 is adjacent to, for example, the positive electrode terminal 20 and the negative electrode terminal 30.

Specifically, the solid electrolyte layer 13 contains one or two or more solid electrolytes (main solid electrolytes). The solid electrolyte layer 13 may be configured of, for example, a single layer or multiple layers. However, the solid electrolyte layer 13 may, for example, contain, together with a main solid electrolyte, one or two or more of a binder (electrolyte binder) and the like. The details regarding the electrolyte binder are, for example, similar to the details regarding the positive electrode binder. Here, a main electrolyte is a "first solid electrolyte" of one embodiment of the present technology.

The main solid electrolyte is capable of conducting lithium ions between the positive electrode layer 11 and the negative electrode layer 12, and includes, for example, one or two or more of a crystalline solid electrolyte, a glass-ceramic solid electrolyte, and the like.

The crystalline solid electrolyte is a crystalline electrolyte. Specifically, the crystalline solid electrolyte is, for example, an inorganic material, a polymer material, or the like, and the inorganic material is, for example, a sulfide, an oxide, or the like. The sulfide is, for example, $Li_2S\text{---}P_2S_5$, $Li_2S\text{---}SiS_2\text{---}Li_3PO_4$, $Li_7P_3S_{11}$, $Li_{3.25}Ge_{0.25}P_{0.75}S$, $Li_{10}GeP_2S_{12}$, or the like. The oxide is, for example, $Li_7La_3Zr_2O_{12}$, $Li_{6.75}La_3Zr_{1.75}Nb_{0.25}O_{12}$, $Li_6BaLa_2Ta_2O_{12}$, $Li_{1+x}Al_xTi_{2-x}(PO_4)_3$, $La_{2/3-x}Li_{3x}TiO_3$, or the like. The polymer material is, for example, polyethylene oxide (PEO) or the like.

The glass-ceramic solid electrolyte is an electrolyte in which amorphous and crystal materials are mixed. The glass-ceramic solid electrolyte is, for example, an oxide containing lithium (Li), silicon (Si), and boron (B) as constituent elements, and more specifically contains lithium oxide ($Li_2O$), silicon oxide ($SiO_2$), boron oxide ($B_2O_3$), and the like. The proportion of the content of lithium oxide to the total content of lithium oxide, silicon oxide, and boron oxide is not particularly limited, and is, for example, 40 mol % to 73 mol %. The proportion of the content of silicon oxide to the total content of lithium oxide, silicon oxide, and boron oxide is not particularly limited, and is, for example, 8 mol % to 40 mol %. The proportion of the content of boron oxide to the total content of lithium oxide, silicon oxide, and boron oxide is not particularly limited, and is, for example, 10 mol % to 50 mol %. In order to measure the respective contents of lithium oxide, silicon oxide and boron oxide, the glass-ceramic solid electrolyte is analyzed by using, for example, inductively coupled plasma emission spectroscopy (ICP-AES).

(Positive Electrode Separation Layer)

The positive electrode separation layer 14 is disposed around the positive electrode layer 11, so that the positive electrode layer 11 is adjacent to the positive electrode terminal 20 and is spaced apart from the negative electrode terminal 30. The positive electrode separation layer 14 may be configured of, for example, a single layer or multiple layers.

Specifically, the positive electrode separation layer 14 is disposed so as to entirely surround the positive electrode layer 11 as shown in FIG. 4, for example. Thus, the positive electrode separation layer 14 includes, for example, four separation portions 14A, 14B, 14C, and 14D.

The separation portion 14A is disposed, for example, between the positive electrode layer 11 and the negative electrode terminal 30 and extends in the Y-axis direction. Consequently, the positive electrode layer 11 is spaced apart from the negative electrode terminal 30 with the separation portion 14A interposed therebetween. Here, the separation portion 14A is a "second solid electrolyte layer" of one embodiment of the present technology.

The separation portion 14B is disposed, for example, between the positive electrode layer 11 and the positive electrode terminal 20 and extends in the Y-axis direction. However, the separation portion 14B is, for example, separated into two layers (a lower layer and an upper layer) in the Z-axis direction with the positive electrode current collector layer 11A interposed therebetween so that the positive electrode current collector layer 11A is adjacent to the positive electrode terminal 20. Consequently, in the positive electrode layer 11, while the positive electrode collector layer 11A is adjacent to the positive electrode terminal 20, the positive electrode active material layer 11B is spaced apart from the positive electrode terminal 20 with the separation portion 14B interposed therebetween. Here, the separation portion 14B is a "third solid electrolyte layer" of one embodiment of the present technology.

The separation portion 14C is disposed, for example, between the positive electrode terminal 20 and the negative electrode terminal 30 and extends in the X-axis direction. The separation portion 14C is, for example, connected to one end of the separation portion 14A on a side close to the negative electrode terminal 30 and connected to one end of the separation portion 14B on a side close to the positive electrode terminal 20.

The separation portion 14D is disposed, for example, between the positive electrode terminal 20 and the negative electrode terminal 30 and extends in the X-axis direction. The separation portion 14D is, for example, connected to the other end of the separation portion 14A on the side close to the negative electrode terminal 30 and connected to the other end of the separation portion 14B on the side close to the positive electrode terminal 20.

In FIG. 4, the positive electrode separation layer 14 is crosshatched so that the positive electrode layer 11 and the positive electrode separation layer 14 can be easily distinguished from each other.

The positive electrode separation layer 14 contains one or two or more solid electrolytes (positive electrode separation solid electrolytes). However, the positive electrode separation layer 14 may, for example, contain, together with a positive electrode separation solid electrolyte, one or two or more of a binder (positive electrode separation binder) and the like. The details regarding each of the positive electrode separation solid electrolyte and the positive electrode separation binder are, for example, similar to the details regarding each of the main solid electrolyte and the positive electrode binder. Here, the positive electrode separation solid electrolyte contained in the separation portion 14A is the "second solid electrolyte" of one embodiment of the present technology, and the positive electrode separation solid electrolyte contained in the separation portion 14B is the "third solid electrolyte" of one embodiment of the present technology.

Here, generally, thermal physical properties of the solid electrolyte are determined by a glass transition temperature Tg and a crystallization temperature Tc. Each of the glass transition temperature Tg and the crystallization temperature Tc is measured (calculated) by analyzing the solid electrolyte using, for example, a thermal analyzer (heating rate=10° C./min). Thus, the thermal physical properties of the solid electrolyte (main solid electrolyte) contained in the solid electrolyte layer 13 are determined by a glass transition temperature Tg1 and a crystallization temperature Tc1. The thermal physical properties of the solid electrolyte (positive electrode separation solid electrolyte) contained in the positive electrode separation layer 14 are determined by a glass transition temperature Tg2 and a crystallization temperature Tc2.

In this case, with respect to the thermal physical properties of the positive electrode separation solid electrolyte, the glass transition temperature Tg2 is set to be lower than the crystallization temperature Tc1, and the crystallization temperature Tc2 is set to be equal to or higher than the glass transition temperature Tg1 (Tg2<Tc1 and Tc2≥Tg1).

The above-described proper conditions are satisfied with respect to the glass transition temperatures Tg1 and Tg2 and the crystallization temperatures Tc1 and Tc2 because, as described later, when a solid battery (particularly, the laminate 10) is formed by using a sintering method, the sinterability of the positive electrode separation layer 14 is ensured so as to be approximately the same as the sinterability of the solid electrolyte layer 13. Consequently, the positive electrode separation layer 14 is densified, so that the battery characteristics of the solid battery are less likely to deteriorate.

Specifically, when the laminate 10 is formed using the sintering method, after formation of a laminate precursor 10Z (see FIG. 8) including the positive electrode layer 11, the solid electrolyte layer 13, the positive electrode separation layer 14, etc., the laminate precursor 10Z is heat-treated. In this case, in order to ensure the sinterability of the solid electrolyte layer 13, the heating temperature is set based on the glass transition temperature Tg1 and the crystallization temperature Tc1.

However, in a case where the proper conditions are not satisfied with respect to the glass transition temperatures Tg1 and Tg2 and the crystallization temperatures Tc1 and Tc2, even if the solid electrolyte layer 13 is sufficiently sintered by the heat treatment, the positive electrode separation layer 14 is not sufficiently sintered, and therefore, denseness of the positive electrode separation layer 14 is insufficient.

If the denseness of the positive electrode separation layer 14, particularly the denseness of the separation portion 14A disposed between the positive electrode layer 11 and the negative electrode terminal 30, is insufficient, an unintended side reaction is likely to occur during charging and discharging of the solid battery. Therefore, an irreversible reaction product containing lithium as a constituent element (hereinafter, simply referred to as "irreversible reaction product") is likely to be formed. There are several possible causes for this side reaction. The causes include, for example, a reaction of lithium with water, carbon dioxide, and the like contained in the external environment of the solid battery. Furthermore, the causes include, for example, a reaction between a conductive adhesive, used in a solid battery, and lithium. This conductive adhesive is used, for example, for bonding each of the positive electrode terminal 20 and the negative electrode terminal 30 to the laminate 10 as described later.

Consequently, since a so-called irreversible capacity is likely to occur due to the formation of the irreversible reaction product, the battery capacity is likely to decrease. Due to the presence of the irreversible reaction product, current collection properties of each of the positive electrode terminal 20 and the negative electrode terminal 30 are likely to be reduced, and thus a charge/discharge reaction is likely to be hindered. Thus, the battery characteristics of the solid battery are likely to deteriorate.

On the other hand, in a case where the proper conditions are satisfied with respect to the glass transition temperatures Tg1 and Tg2 and the crystallization temperatures Tc1 and Tc2, the solid electrolyte layer 13 is sufficiently sintered by the heat treatment, and the positive electrode separation layer 14 is also sufficiently sintered; therefore, the denseness of the positive electrode separation layer 14 is ensured.

Consequently, the side reactions described above are less likely to occur, so that the irreversible reaction product is less likely to be formed. Thus, the irreversible capacity is less likely to occur, so that the battery capacity is less likely to decrease, and the current collection properties of each of the positive electrode terminal 20 and the negative electrode terminal 30 are less likely to be reduced; therefore, the charge/discharge reaction is less likely to be hindered. As a result, the battery characteristics of the solid battery are less likely to deteriorate.

The ionic conductivity of the positive electrode separation layer 14 is set to be lower than the ionic conductivity of the solid electrolyte layer 13. That is, the ionic conductivity of the positive electrode separation layer 14 is lower than the ionic conductivity of the solid electrolyte layer 13.

The above-described proper conditions are satisfied with respect to the ionic conductivity of the positive electrode separation layer 14 and the ionic conductivity of the solid electrolyte layer 13 because ions are less likely to be conducted in the positive electrode separation layer 14, and thus the battery characteristics of the solid battery are much less likely to deteriorate.

Specifically, in a case where the proper conditions are not satisfied with respect to the ionic conductivity of the positive electrode separation layer 14 and the ionic conductivity of the solid electrolyte layer 13, not only are the ions easily conducted in the solid electrolyte layer 13, but the ions are also easily conducted in the positive electrode separation layer 14. In this case, the side reactions described above are likely to occur due to the ease of the conduction of ions in the positive electrode separation layer 14, so that the irreversible reaction product is easily formed. Thus, as described above, the battery capacity is likely to decrease, and the charge/discharge reaction is likely to be hindered, so that the battery characteristics of the solid battery are likely to deteriorate.

On the other hand, in a case where the proper conditions are satisfied with respect to the ionic conductivity of the positive electrode separation layer 14 and the ionic conductivity of the solid electrolyte layer 13, while ions are easily conducted in the solid electrolyte layer 13, the ions are less likely to be conducted in the positive electrode separation layer 14. In this case, the side reactions described above are less likely to occur due to the difficulty of the conduction of ions in the positive electrode separation layer 14, so that the irreversible reaction product is less likely to be formed. Thus, the battery capacity is less likely to decrease, and the charge/discharge reaction is less likely to be hindered, so that the battery characteristics of the solid battery are less likely to deteriorate.

The configuration of the positive electrode separation layer 14 (positive electrode separation solid electrolyte) is not particularly limited as long as the above-described conditions with respect to the glass transition temperature Tg2, the crystallization temperature Tc2, and the ionic conductivity are satisfied.

Specifically, the positive electrode separation layer 14 contains, for example, a positive electrode separation electrolyte having an ionic conductivity lower than the ionic conductivity of the main solid electrolyte. The type of the positive electrode separation solid electrolyte is not particularly limited as long as the positive electrode separation solid electrolyte has an ionic conductivity lower than the ionic conductivity of the main solid electrolyte. Consequently, the ionic conductivity of the positive electrode separation layer 14 is lower than the ionic conductivity of the solid electrolyte layer 13.

In this case, the ionic conductivity of the positive electrode separation layer 14 is lowered without using an insulating material described later, so that the sinterability and denseness of the positive electrode separation layer 14 are easily ensured.

Alternatively, the positive electrode separation layer 14 contains, for example, one or two or more insulating materials together with the positive electrode separation solid electrolytes. This is because the positive electrode separation layer 14 contains an insulating material, so that the ion conductivity of the entire positive electrode separation layer 14 is lowered. Consequently, the ionic conductivity of the positive electrode separation layer 14 is lower than the ionic conductivity of the solid electrolyte layer 13. The ionic conductivity of the positive electrode separation solid electrolyte is not particularly limited as long as the ionic conductivity of the entire positive electrode separation layer 14 is lowered by using the insulating material. That is, the ionic conductivity of the positive electrode separation solid electrolyte is not limited to being lower than the ionic conductivity of the main solid electrolyte, and may be equal to or higher than the ionic conductivity of the main solid electrolyte.

In this case, the ionic conductivity of the entire positive electrode separation layer 14 is easily and sufficiently lowered by using the insulating material. However, in the case of using an insulating material, in order to sufficiently lower the ionic conductivity of the entire positive electrode separation layer 14, if the content of the insulating material in the positive electrode separation layer 14 is too large, the sinterability and denseness of the positive electrode separation layer 14 may be reduced.

More specifically, as described later, when the positive electrode separation layer 14 is formed using the sintering method, if the content of the insulating material is too large, the positive electrode separation layer 14 is less likely to be sintered. Therefore, voids are easily generated in the positive electrode separation layer 14. When voids are generated in the positive electrode separation layer 14, the above-described side reactions are likely to occur, so that the irreversible reaction product may be likely to be formed.

The type, content, etc., of the insulating material are not particularly limited as long as the ionic conductivity of the positive electrode separation layer 14 is lower than the ionic conductivity of the solid electrolyte layer 13. Specifically, the insulating material is, for example, aluminum oxide ($Al_2O_3$), boron nitride (BN), silicon dioxide ($SiO_2$), silicon nitride ($Si_3N_4$), zirconium oxide ($ZrO_2$), aluminum nitride (AlN), silicon carbide (SiC), barium titanate ($BaTiO_3$), or the like.

The above-described conditions with respect to the glass transition temperature Tg2, the crystallization temperature Tc2, and the ionic conductivity of the positive electrode separation layer 14 (positive electrode separation solid electrolyte) are naturally satisfied also in each of the separation portions 14A to 14D.

(Negative Electrode Separation Layer)

The negative electrode separation layer 15 is disposed around the negative electrode layer 12, so that the negative electrode layer 12 is spaced apart from the positive electrode terminal 20 and is adjacent to the negative electrode terminal 30. The negative electrode separation layer 15 may be configured of, for example, a single layer or multiple layers.

Specifically, the negative electrode separation layer 15 is disposed so as to partially surround the negative electrode layer 12 as shown in FIG. 5, for example. Thus, the negative electrode separation layer 15 includes, for example, three separation portions 15A, 15B, and 15C.

The separation portion 15A is disposed, for example, between the negative electrode layer 12 and the positive electrode terminal 20 and extends in the Y-axis direction. Consequently, the negative electrode layer 12 is spaced apart from the positive electrode terminal 20 with the separation portion 15A interposed therebetween. Here, the separation portion 15A is a "second solid electrolyte layer" of one embodiment of the present invention.

The separation portion 15B is disposed, for example, between the negative electrode terminal 30 and the positive electrode terminal 20 and extends in the X-axis direction. The separation portion 15B is, for example, connected to one end of the separation portion 15A on the side close to the positive electrode terminal 20.

The separation portion 15C is disposed, for example, between the negative electrode terminal 30 and the positive electrode terminal 20 and extends in the X-axis direction. The separation portion 15C is, for example, connected to the other end of the separation portion 15A on the side close to the positive electrode terminal 20.

In FIG. 5, the negative electrode separation layer 15 is crosshatched so that the negative electrode layer 12 and the negative electrode separation layer 15 can be easily distinguished from each other.

The configuration of the negative electrode separation layer 15 is, for example, similar to the configuration of the positive electrode separation layer 14.

However, the configuration of the negative electrode separation layer 15 (type of forming material, etc.) may be, for example, the same as or different from the configuration of the positive electrode separation layer 14.

That is, the negative electrode separation layer 15 includes one or two or more solid electrolytes (negative electrode separation solid electrolytes) and further may contain one or two or more binders (negative electrode separation binder) and the like. The details regarding each of the negative electrode separation solid electrolyte and the negative electrode separation binder are, for example, similar to the details regarding each of the main solid electrolyte and the positive electrode separation binder. Here, the negative electrode separation solid electrolyte contained in the separation portion 15A is the "second solid electrolyte" of one embodiment of the present technology.

Regarding the thermal physical properties of the negative electrode separation solid electrolyte, the same conditions as the above-described conditions regarding the thermal physical properties of the positive electrode separation solid electrolyte are satisfied. Thus, when the thermal physical properties of the negative electrode separation solid electrolyte are determined by a glass transition temperature Tg3 and a crystallization temperature Tc3, the glass transition temperature Tg3 is set to be lower than the crystallization temperature Tc1, and the crystallization temperature Tc3 is set to be equal to or higher than the glass transition temperature Tg1 (Tg3<Tc1 and Tc3≥Tg1).

In addition, regarding the ionic conductivity of the negative electrode separation layer 15, the same conditions as the above-described conditions regarding the ionic conductivity of the positive electrode separation layer 14 are satisfied. Thus, the ionic conductivity of the negative electrode separation layer 15 is set to be lower than the ionic conductivity of the solid electrolyte layer 13.

Consequently, the negative electrode separation layer 15 is densified, and ions are less likely to be conducted in the negative electrode separation layer 15; therefore, the battery capacity is less likely to decrease, and the charge/discharge reaction is less likely to be hindered. Thus, the battery characteristics of the solid battery are much less likely to deteriorate.

(Protective Layer)

The protective layer 16 protects the main parts (the positive electrode layer 11, the negative electrode layer 12, and the solid electrolyte layer 13) of the laminate 10. The configuration of the protective layer 16 is, for example, similar to the configuration of the solid electrolyte layer 13. However, the configuration of the protective layer 16 (type of forming material, etc.) may be, for example, the same as or different from the configuration of the solid electrolyte layer 13.

(Positive electrode terminal)

The positive electrode terminal 20 is attached to one side surface of the laminate 10.

Consequently, the positive electrode terminal 20 is adjacent to the positive electrode layer 11, and thus is electrically connected to the positive electrode layer 11.

The positive electrode terminal 20 contains, for example, one or two or more conductive materials. The conductive material is, for example, a metal material or the like. Specifically, the metal material is, for example, silver, gold, platinum, aluminum, copper, tin, nickel, or the like, and may be an alloy formed of two or more kinds thereof.

(Negative electrode terminal)

The negative electrode terminal 30 is spaced apart from the positive electrode terminal 20, and is attached to the other side surface of the laminate 10. Consequently, the negative electrode terminal 30 is adjacent to the negative electrode layer 12, and thus is electrically connected to the negative electrode layer 12.

The configuration of the negative electrode terminal 30 is, for example, similar to the configuration of the positive electrode terminal 20. That is, the negative electrode terminal 30 contains, for example, one or two or more conductive materials. However, the configuration of the negative electrode terminal 30 (type of forming material, etc.) may be, for example, the same as or different from the configuration of the positive electrode terminal 20.

1-2. Face-to-Face Relationship Between Positive Electrode Layer and Negative Electrode Layer Here, a face-to-face relationship between the positive electrode layer 11 and the negative electrode layer 12 will be described with reference to FIGS. 2 and 3.

In this solid battery, since the laminate 10 includes the positive electrode separation layer 14 and the negative electrode separation layer 15, the face-to-face relationship between the positive electrode layer 11 and the negative electrode layer 12 is set as described later. A center line L shown in each of FIGS. 2 and 3 is an imaginary line located at the center of the solid battery in each of the X-axis direction and the Y-axis direction and extending in the Z-axis direction.

Specifically, for example, as shown in FIG. 2, an end T1 of the positive electrode layer 11 on the side close to the negative electrode terminal 30 is preferably located on a side far from the negative electrode terminal 30 relative to an end T2 of the negative electrode layer 12 on the side close to the negative electrode terminal 30. In other words, a position P1 of the end T1 is preferably closer to the center line L relative to a position P2 of the end T2.

This is because an extension range of the positive electrode layer 11 in the X-axis direction is narrower than an extension range of the negative electrode layer 12 in the same direction, so that so-called non-facing portions do not occur in the negative electrode layer 12. The non-facing portion is a portion of the negative electrode layer 12 which cannot face the positive electrode layer 11, and occurs when the extension range of the positive electrode layer 11 in the X-axis direction is wider than the extension range of the negative electrode layer 12 in the same direction. Consequently, the negative electrode layer 12 faces the positive electrode layer 11 even in the vicinity of the end T1, so that a destination in which lithium ions are absorbed is secured in the negative electrode layer 12. Thus, in the negative electrode layer 12, a local absorption phenomenon of lithium ions is less likely to occur, and a precipitation phenomenon of the lithium ions is less likely to occur.

For example, an end T3 of the positive electrode layer 11 on the side close to the positive electrode terminal 20 is preferably located on a side far from the positive electrode terminal 20 relative to an end T4 of the negative electrode layer 12 on the side close to the positive electrode terminal 30. In other words, a position P3 of the end T3 is preferably closer to the center line L relative to a position P4 of the end T4. This is because the negative electrode layer 12 faces the positive electrode layer 11 even in the vicinity of the end T3 for the same reason as the case described with respect to the ends T1 and T2 (positions P1 and P2) described above. Consequently, in the negative electrode layer 12, the local absorption phenomenon of lithium ions is less likely to occur, and the precipitation phenomenon of the lithium ions is less likely to occur.

For example, as shown in FIG. 3, an end T5 of the positive electrode layer 11 on one end side in the Y-axis direction is preferably located inside relative to an end T6 of the negative electrode layer 12 on the one end side. In other words, a position P5 of the end T5 is preferably closer to the center line L relative to a position P6 of the end T6. This is because the same advantages as in the case of the ends T1 and T2 (positions P1 and P2) described above can be obtained.

For example, an end T7 of the positive electrode layer 11 on the other end side in the Y-axis direction is preferably located inside relative to an end T8 of the negative electrode layer 12 on the other end side. In other words, a position P7 of the end T7 is preferably closer to the center line L relative to a position P8 of the end T8. This is because the same advantages as in the case of the ends T1 and T2 (positions P1 and P2) described above can be obtained.

1-3. Operation

Next, the operation of the solid battery will be described with reference to FIGS. 1 to 3.

When the solid battery is charged, for example, lithium ions are released from the positive electrode layer 11, and the lithium ions are absorbed in the negative electrode layer 12 through the solid electrolyte layer 13. On the other hand, when the solid battery is discharged, for example, lithium ions are released from the negative electrode layer 12, and the lithium ions are absorbed in the positive electrode layer 11 through the solid electrolyte layer 13.

1-4. Manufacturing Method

Next, a method of manufacturing a solid battery will be described.

Figure 6:
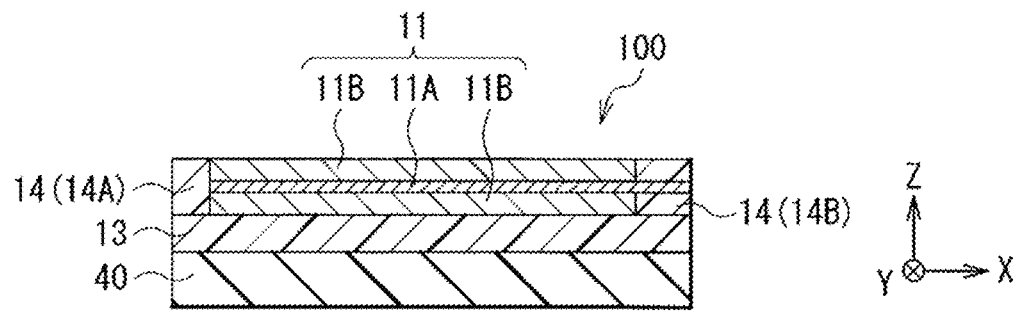
FIG. 6 is a sectional view for explaining a method of producing a positive electrode green sheet.
Figure 7:
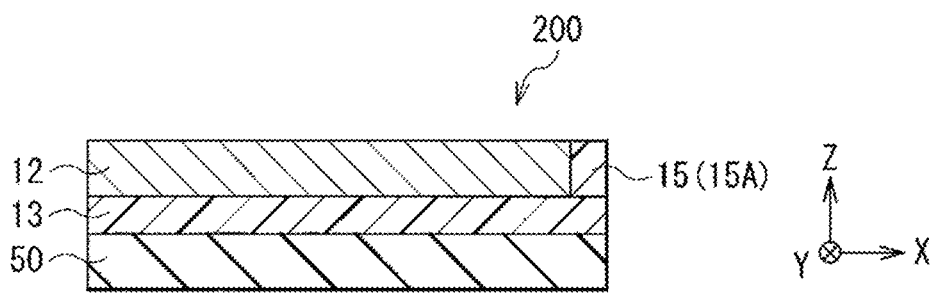
FIG. 7 is a sectional view for explaining a method of producing a negative electrode green sheet.
Figure 8:
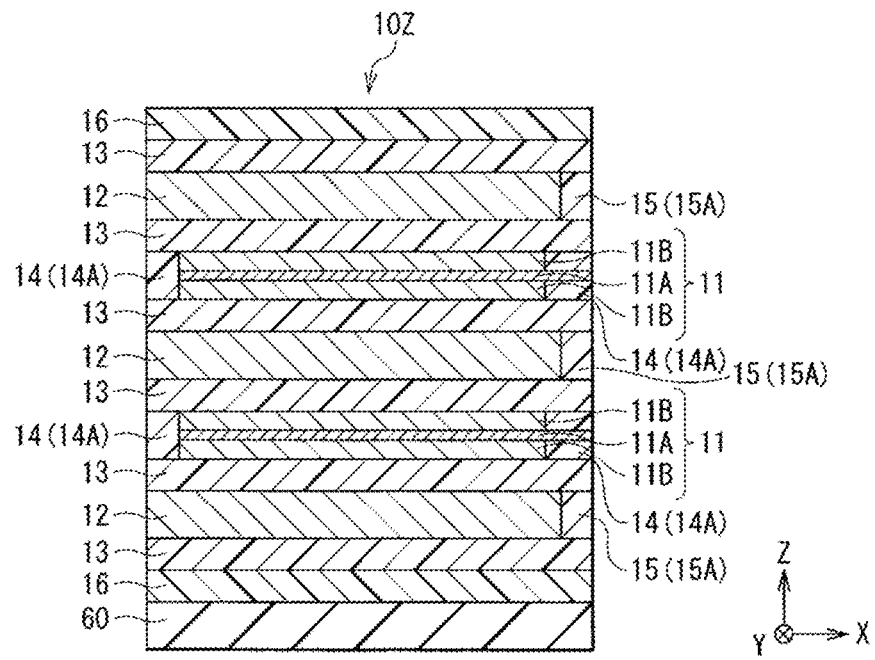
FIG. 8 is a sectional view for explaining a method of producing a laminate.

FIG. 6 shows a sectional configuration of a positive electrode green sheet 100 in order to explain a method of producing the positive electrode green sheet 100, and corresponds to FIG. 2. FIG. 7 shows a sectional configuration of a negative electrode green sheet 200 in order to explain a method of producing the negative electrode green sheet 200, and corresponds to FIG. 2. FIG. 8 shows a sectional configuration of the laminate precursor 10Z used for producing the laminate 10 in order to explain a method of producing the laminate 10, and corresponds to FIG. 2.

In order to manufacture the solid battery, for example, as described later, a step of forming the positive electrode green sheet 100, a step of forming the negative electrode green sheet 200, a step of forming the laminate 10, and a step of forming each of the positive electrode terminal 20 and the negative electrode terminal 30 are performed.

[Step of forming positive electrode green sheet]

First, an electrolyte slurry is prepared by mixing a main solid electrolyte, a solvent, optionally an electrolyte binder, etc. The type of the solvent is not particularly limited, and the solvent is, for example, one or two or more organic solvents such as butyl acetate, N-methyl-pyrrolidone, and toluene.

Subsequently, as shown in FIG. 6, the solid electrolyte layer 13 is formed by applying the electrolyte slurry to one surface of a base 40. The type of the base 40 is not particularly limited as long as the base 40 is a support capable of supporting the solid electrolyte layer 13, and the base 40 is, for example, a release film having one surface subjected to a release treatment, or the like. The details regarding the base 40 described here are the same for the bases 50 and 60 described later.

Subsequently, a positive electrode separation slurry is prepared by mixing a positive electrode separation solid electrolyte, a solvent, optionally a positive electrode separation binder, etc. Subsequently, the separation portions 14A, 14C, and 14D are formed by applying the positive electrode separation slurry onto a surface of the solid electrolyte layer 13 by using a pattern forming method. The kind of the pattern forming method is not particularly limited as long as the pattern forming method is a method capable of forming a film so as to form a predetermined pattern, and, for example, one or two or more of a screen printing method, a gravure printing method, and the like may be used. The details regarding the pattern forming method described here are the same in the following.

Subsequently, a positive electrode slurry is prepared by mixing a positive electrode active material, a solvent, optionally a positive electrode binder, etc. The type of the solvent is not particularly limited, and the solvent is, for example, one or two or more organic solvents such as terpineol and N-methyl-pyrrolidone.

Subsequently, the positive electrode active material layer 11B is formed by applying the positive electrode active material slurry onto the surface of the solid electrolyte layer 13 by using the pattern forming method, and a portion (lower layer) of the separation portion 14B is formed by applying the positive electrode separation slurry onto the surface of the solid electrolyte layer 13 by using the pattern forming method.

Subsequently, a positive electrode current collector slurry is prepared by mixing a conductive material, a solvent, optionally a positive electrode current collector binder, etc. The details regarding the solvent used for preparing the positive electrode current collector slurry are, for example, similar to the details regarding the solvent used for preparing the positive electrode active material slurry.

Subsequently, the positive electrode current collector layer 11A is formed by applying the positive electrode current collector slurry onto each surface of the positive electrode active material layer 11B and the separation portion 14B (lower layer) by using the pattern forming method.

Finally, the positive electrode active material layer 11B and the rest (upper layer) of the separation portion 14B are formed on the positive electrode current collector layer 11A by the above-described procedure. Consequently, the two positive electrode active material layers 11B are stacked on each other with the single positive electrode current collector layer 11A interposed therebetween, so that the positive electrode layer 11 is formed, and the positive electrode separation layer 14 including the separation portions 14A to 14D is formed. Thus, since the positive electrode layer 11 and the positive electrode separation layer 14 are formed so as to be arranged in the same layer, the positive electrode green sheet 100 including the positive electrode layer 11, the solid electrolyte layer 13, and the positive electrode separation layer 14 is obtained.

[Step of Forming Negative Electrode Green Sheet]

First, an electrolyte slurry is prepared by the above-described procedure, and then, as shown in FIG. 7, the solid electrolyte layer 13 is formed on one surface of a base 50.

Subsequently, a negative electrode separation slurry is prepared by a similar procedure to the positive electrode separation slurry preparation procedure. Subsequently, the negative electrode separation layer 15 (separation portions 15A to 15C) is formed by applying the negative electrode separation slurry onto the surface of the solid electrolyte layer 13 by using the pattern forming method.

Finally, a negative electrode active material slurry is prepared by mixing a negative electrode active material, a solvent, optionally a negative electrode binder, etc. The details regarding the solvent used for preparing the negative electrode active material slurry are, for example, similar to the details regarding the solvent used for preparing the positive electrode active material slurry. Subsequently, the negative electrode layer 12 is formed by applying the negative electrode active material slurry onto the surface of the solid electrolyte layer 13 by using the pattern forming method. Consequently, since the negative electrode layer 12 and the negative electrode separation layer 15 are formed so as to be arranged in the same layer, the negative electrode green sheet 200 including the negative electrode layer 12, the solid electrolyte layer 13, and the negative electrode separation layer 15 is obtained.

[Step of Forming Laminate]

First, a protective slurry is prepared by a similar procedure to the electrolyte slurry preparation procedure. Subsequently, as shown in FIG. 8, the protective layer 16 is formed by applying the protective slurry to one surface of a base 60.

Subsequently, on the protective layer 16, the positive electrode green sheet 100 peeled from the base 40 and the negative electrode green sheet 200 peeled from the base 50 are stacked. In this case, for example, in order to manufacture the solid battery shown in FIGS. 1 to 3, two positive electrode green sheets 100 and three negative electrode green sheets 200 are alternately stacked.

Subsequently, by the above-described procedure, the solid electrolyte layer 13 is formed on the negative electrode layer 12 which is the uppermost layer and the negative electrode separation layer 15 which is the uppermost layer, and then, the protective layer 16 is formed on the solid electrolyte layer 13. Consequently, the laminate precursor 10Z including the positive electrode layer 11, the negative electrode layer 12, the solid electrolyte layer 13, the positive electrode separation layer 14, the negative electrode separation layer 15, and the protective layer 16 is formed.

Finally, the laminate precursor 10Z is heated. In this case, the heating temperature is set so that the series of layers forming the laminate precursor 10Z are sintered. Other conditions such as heating time can be set arbitrarily. By this heat treatment, the series of layers forming the laminate precursor 10Z are sintered, so that the series of layers are thermocompression-bonded.

Thus, the laminate 10 is formed.

[Step of Forming Each of Positive Electrode Terminal and Negative Electrode Terminal]

For example, the positive electrode terminal 20 is bonded to the laminate 10 using a conductive adhesive, and, for example, the negative electrode terminal 30 is bonded to the laminate 10 using a conductive adhesive. Consequently, each of the positive electrode terminal 20 and the negative electrode terminal 30 is formed, so that the solid battery is completed.

1-5. Operation and Effects

According to the solid battery of the present technology, the glass transition temperature Tg2 of the positive electrode separation solid electrolyte is set to be lower than the crystallization temperature Tc1 of the main solid electrolyte, and the crystallization temperature Tc2 of the positive electrode separation solid electrolyte is set to be equal to or higher than the glass transition temperature Tg1 of the main solid electrolyte. The ionic conductivity of the positive electrode separation layer 14 (separation portion 14A) is set to be lower than the ionic conductivity of the solid electrolyte layer 13.

In this case, as described above, when the solid battery (laminate 10) is formed by using the sintering method, the sinterability of the separation portion 14A is ensured so as to be approximately the same as the sinterability of the solid electrolyte layer 13, so that the separation portion 14A is densified. Consequently, an unintended side reaction is less likely to occur, so that the irreversible reaction product is less likely to be formed.

The advantages of the positive electrode separation layer 14 (separation portion 14A) described here are similarly obtained for the negative electrode separation layer 15 (separation portion 15A). That is, the glass transition temperature Tg3 of the negative electrode separation solid electrolyte is set to be lower than the crystallization temperature Tc1 of the main solid electrolyte, and the crystallization temperature Tc3 of the negative electrode separation solid electrolyte is set to be equal to or higher than the glass transition temperature Tg1 of the main solid electrolyte. The ionic conductivity of the separation portion 15A is set to be lower than the ionic conductivity of the solid electrolyte layer 13. Consequently, an unintended side reaction is much less likely to occur, so that the irreversible reaction product is much less likely to be formed.

Thus, the battery capacity is less likely to decrease, and the charge/discharge reaction is less likely to be hindered, so that the battery characteristics of the solid battery are less likely to deteriorate; therefore, the battery characteristics of the solid battery can be improved.

Particularly, if the solid battery includes both of the separation portions 14A and 15A, the irreversible reaction product is less likely to be formed in both of the separation portions 14A and 15A, so that a higher effect can be obtained.

If the ionic conductivity of the positive electrode separation solid electrolyte is lower than the ionic conductivity of the main solid electrolyte, the ionic conductivity of the separation portion 14A becomes sufficiently lower than the ionic conductivity of the solid electrolyte layer 13, and therefore, a higher effect can be obtained. This advantage is also obtained when the ionic conductivity of the negative electrode separation solid electrolyte is lower than the ionic conductivity of the main solid electrolyte.

If the separation portion 14A contains an insulating material together with the positive electrode separation solid electrolyte, the ionic conductivity of the separation portion 14A is likely to be lowered, so that a higher effect can be obtained. In this case, if the insulating material contains aluminum oxide and the like, the ionic conductivity of the separation portion 14A is sufficiently lowered, so that a higher effect can be obtained. These advantages are also obtained when the separation portion 15A contains an insulating material together with the negative electrode separation solid electrolyte.

If the end T3 of the positive electrode layer 11 (positive electrode active material layer 11B) is located on the side far from the positive electrode terminal 20 relative to the end T4 of the negative electrode layer 12, a non-facing portion is not formed in the negative electrode layer 12. Thus, a local absorption phenomenon of lithium ions is less likely to occur, and a precipitation phenomenon of the lithium ions is less likely to occur, so that a higher effect can be obtained. In this case, if the solid battery further includes the positive electrode separation layer 14 (separation portion 14B), the irreversible reaction product is less likely to be formed even in the separation portion 14B, so that a higher effect can be obtained.

2. Modified Example

The configuration of the solid battery of the present technology can be appropriately changed.

Figure 9:
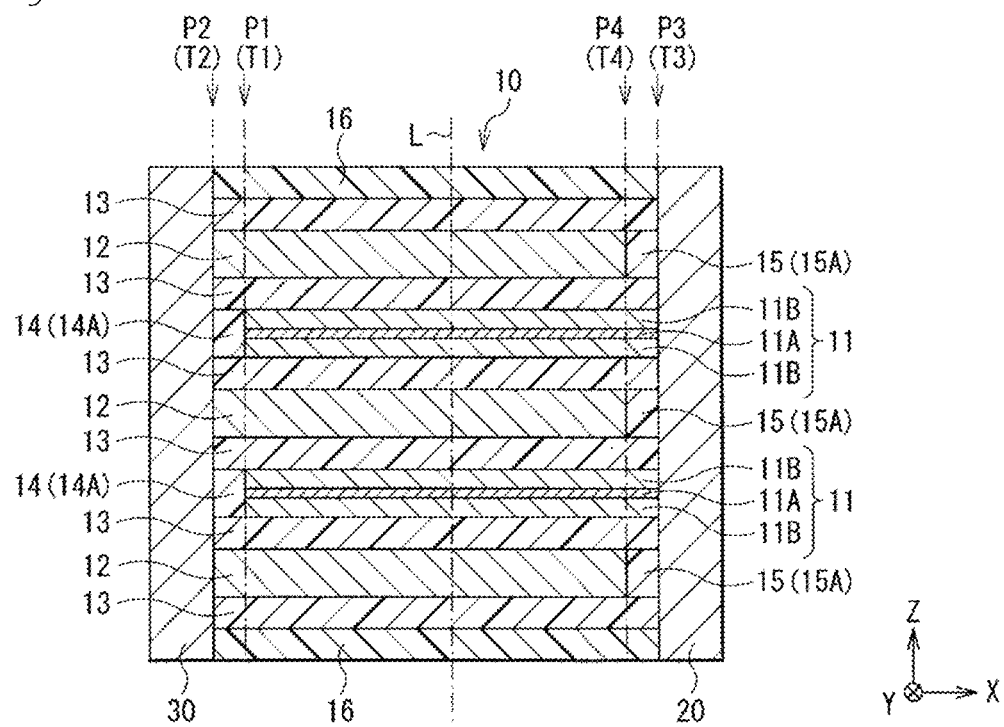
FIG. 9 is a sectional view showing a configuration of a solid battery of a modified example.

Specifically, in FIGS. 2 and 4, since the positive electrode separation layer 14 includes the separation portion 14B, the positive electrode active material layer 11B is spaced apart from the positive electrode terminal 20. However, for example, as shown in FIG. 9 corresponding to FIG. 2 and FIG. 10 corresponding to FIG. 4, since the positive electrode separation layer 14 does not include the separation portion 14B, the positive electrode active material layer 11B may be adjacent to the positive electrode terminal 20. In this case, since the end T3 of the positive electrode active material layer 11B is located on the side close to the positive electrode terminal 20 relative to the end T4 of the negative electrode layer 12, the position P3 of the end T3 is far from the center line L relative to the position P4 of the end T4.

Also in this case, since the irreversible reaction product is less likely to be formed in each of the positive electrode separation layer 14 (separation portion 14A) and the negative electrode separation layer 15 (separation portion 15A), for the same reason as the case shown in FIG. 2, the battery characteristics can be improved. However, in order to further improve the battery characteristics, as shown in FIG. 2, since the end T3 is located on the side far from the positive electrode terminal 20 relative to the end T4, the position P3 of the end T3 is preferably close to the center line L relative to the position P4 of the end T4.

3. Applications of Solid Battery

Next, description is given to applications of the foregoing solid battery.

Applications of a solid battery are not particularly limited as long as the solid battery is applied to a machine, a device, an appliance, an apparatus, a system (collective entity of a plurality of devices and the like), or the like that is capable of using the secondary battery as a driving electric power source, an electric power storage source for electric power accumulation, and the like. The solid battery used as an electric power source may be a main electric power source, or may be an auxiliary electric power source. The main electric power source is an electric power source used preferentially regardless of the presence or absence of other power sources. The auxiliary electric power source may be, for example, an electric power source used instead of the main electric power source or an electric power source used by being switched from the main electric power source as necessary. When the solid battery is used as the auxiliary electric power source, the kind of the main electric power source is not limited to the solid battery.

Examples of applications of the solid battery include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof include a mobile daily electric appliance such as an electric shaver; a storage device such as a backup electric power source and a memory card; an electric power tool such as an electric drill and an electric saw; a battery pack used as an attachable and detachable electric power source of, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for emergency. It goes without saying that the solid battery may be employed for an application other than the applications described above.

EXAMPLES

Description is given on examples of the present technology.

Experimental Examples 1 to 7

After the solid battery shown in FIGS. 1 to 5 was produced, the battery characteristics of the solid battery were evaluated.

[Production of Solid Battery]

First, the solid battery was produced by the procedure described later.

(Formation of Positive Electrode Green Sheet)

First, an electrolyte slurry, a positive electrode separation slurry, a positive electrode active material slurry, and a positive electrode current collector slurry were prepared.

When the electrolyte slurry was prepared, a main solid electrolyte ($60Li_2O$-$10SiO_2$-$30B_2O_3$ which was an oxide glass A), an electrolyte binder (acrylic resin), and a solvent (butyl acetate) were mixed, and then the resultant mixture was stirred (stirring time=4 hours) using zirconia balls (diameter=5 mm). In this case, a mixing ratio (weight ratio) of the main solid electrolyte and the electrolyte binder was set to 70:30, and the solid content concentration in the mixture was set to 30% by weight.

When the positive electrode separation slurry was prepared, first, a positive electrode separation solid electrolyte and optionally an insulating material (aluminum oxide powder, AHP300 manufactured by Nippon Light Metal Company, Ltd.) were mixed.

As the positive electrode separation solid electrolyte, the above-described oxide glass A (glass transition temperature Tg=325° C., crystallization temperature Tc=393° C.), the oxide glass B ($54Li_2O$-$11SiO_2$-$35B_2O_3$, glass transition temperature Tg=382° C., crystallization temperature Tc=460° C.) different from the oxide glass A in the ionic conductivity, and an oxide glass C ($47Li_2O$-$8SiO_2$-$45B_2O_3$, glass transition temperature Tg=430° C., crystallization temperature Tc=500° C.) and an oxide glass D ($74Li_2O$-$5SiO_2$-$21B_2O_3$, glass transition temperature Tg=193° C., crystallization temperature Tc=270° C.) which were different from the oxide glass A in the glass transition temperature Tg and the crystallization temperature Tc were used. The ionic conductivity (S/cm) and the content (% by weight) of the insulating material of each of the positive electrode separation solid electrolytes (oxide glass A, oxide glass B, oxide glass C, and oxide glass D) are as shown in Table 1.

Subsequently, the above-described mixture, a positive electrode separation binder (acrylic resin), and a solvent (butyl acetate) were mixed, and then the resultant mixture was stirred (stirring time=4 hours) using zirconia balls (diameter=5 mm). In this case, a mixing ratio (weight ratio) of the mixture and the positive electrode separation binder was set to 70:30, and the solid content concentration in the mixture was set to 30% by weight.

When the positive electrode active material slurry was prepared, a positive electrode active material (lithium cobalt oxide ($LiCoO_2$)), a positive electrode solid electrolyte (oxide glass A), a positive electrode binder (acrylic resin), and a solvent (terpineol) were mixed, and then the resultant mixture was stirred (rotation speed=3000 rpm, stirring time=1 hour) using a stirrer (rotating/revolving mixer manufactured by Thinky Corporation). In this case, a mixing ratio (weight ratio) of the positive electrode active material and the positive electrode solid electrolyte was set to 50:50, and a mixing ratio (weight ratio) of the positive electrode active material and the positive electrode solid electrolyte to the positive electrode binder was set to 80:20 The solid content concentration in the mixture was set to 60% by weight.

When the positive electrode current collector slurry was prepared, a conductive material (graphite), a positive electrode current collector solid electrolyte (oxide glass A), a positive electrode current collector binder (acrylic resin), and a solvent (terpineol) were mixed, and then the resultant mixture was stirred. In this case, a mixing ratio (weight ratio) of the conductive material and the positive electrode current collector solid electrolyte was set to 50:50, and a mixing ratio (weight ratio) of the conductive material and the positive electrode current collector solid electrolyte to the positive electrode current collector binder was set to 80:20. The solid content concentration in the mixture was set to 60% by weight. The stirring conditions were similar to the stirring conditions used when the positive electrode active material slurry was prepared.

Subsequently, the electrolyte slurry was applied onto one surface of the base 40 (release film manufactured by Toray Industries, Inc.) and then dried (drying temperature=80° C., drying time=10 minutes) to form the solid electrolyte layer 13. Subsequently, the positive electrode separation slurry was applied onto the surface of the solid electrolyte layer 13 by using the screen printing method and then dried (drying temperature=80° C., drying time=10 minutes) to form a portion (separation portions 14A, 14C, and 14D) of the positive electrode separation layer 14.

Subsequently, the positive electrode active material slurry and the positive electrode separation slurry were applied onto the surface of the solid electrolyte layer 13 by using the screen printing method and then dried (drying temperature=80° C., drying time=5 minutes) to form the positive electrode active material layer 11B and a portion (lower layer) of the separation portion 14B.

Subsequently, the positive electrode current collector slurry was applied onto each surface of the positive electrode active material layer 11B and the separation portion 14B (lower surface) by using the screen printing method and then dried (drying temperature=80° C., drying time=5 minutes) to form the positive electrode current collector layer 11A.

Finally, the positive electrode active material layer 11B and the separation portion 14B (upper layer) were formed on the positive electrode current collector layer 11A by the above-described procedure. Consequently, since the positive electrode separation layer 14 including the separation portions 14A to 14D was formed, the positive electrode green sheet 100 including the positive electrode layer 11, the solid electrolyte layer 13, and the positive electrode separation layer 14 was obtained.

(Formation of Negative Electrode Green Sheet)

First, an electrolyte slurry, a negative electrode separation slurry, and a negative electrode active material slurry were prepared. However, the procedure for preparing the electrolyte slurry was as described above, and the procedure for preparing the negative electrode separation slurry was similar to the procedure for preparing the positive electrode separation slurry.

When the negative electrode active material slurry was prepared, a negative electrode active material (graphite), a negative electrode solid electrolyte (oxide glass A), a negative electrode binder (acrylic resin), and a solvent (terpineol) were mixed, and then the resultant mixture was stirred. In this case, a mixing ratio (weight ratio) of the negative electrode active material and the negative electrode solid electrolyte was set to 50:50, and a mixing ratio (weight ratio) of the negative electrode active material and the negative electrode solid electrolyte to the negative electrode binder was set to 80:20 The solid content concentration in the mixture was set to 60% by weight.

Subsequently, the solid electrolyte layer 13 was formed on one surface of the base 50 (release film manufactured by Toray Industries, Inc.) by the procedure described above. Subsequently, the negative electrode separation slurry was applied onto the surface of the solid electrolyte layer 13 by using the screen printing method and then dried to form the negative electrode separation layer 15. The drying conditions for the negative electrode separation slurry were similar to the dry conditions for the positive electrode separation slurry.

Finally, the negative electrode active material slurry was applied onto the surface of the solid electrolyte layer 13 by using the screen printing method and then dried to form the negative electrode layer 12. The drying conditions for the negative electrode active material slurry were similar to the dry conditions for the positive electrode active material slurry. Consequently, the negative electrode green sheet 200 including the negative electrode layer 12, the solid electrolyte layer 13, and the negative electrode separation layer 15 was obtained.

(Formation of Laminate)

First, a protective slurry was prepared by a similar procedure to the electrolyte slurry preparation procedure. Subsequently, the protective slurry was applied onto one surface of the base 60 (release film manufactured by Toray Industries, Inc.) and then dried to form the protective layer 16. The drying conditions for the protective slurry were similar to the dry conditions for the electrolyte slurry.

Subsequently, on the protective layer 16, 24 positive electrode green sheets 100 from which the base 40 was peeled and 24 negative electrode green sheets 200 from which the base 50 was peeled were alternately stacked (total number of stacked layers=48 layers). In this case, the stacking order was adjusted so that the uppermost layer was the negative electrode green sheet 200.

Subsequently, by the above-described procedure, the solid electrolyte layer 13 was formed on each of the negative electrode layer 12 which was the uppermost layer and the negative electrode separation layer 15 which was the uppermost layer, and then, the protective layer 16 was formed on the solid electrolyte layer 13 again. Consequently, the laminate precursor 10Z including the positive electrode layer 11, the negative electrode layer 12, the solid electrolyte layer 13, the positive electrode separation layer 14, the negative electrode separation layer 15, and the protective layer 16 was formed.

Finally, the base 60 was peeled from the laminate precursor 10Z, and then the laminate precursor 10Z was heated. Consequently, each of the positive electrode layer 11, the negative electrode layer 12, the solid electrolyte layer 13, the positive electrode separation layer 14, the negative electrode separation layer 15, and the protective layer 16 was sintered, whereby the series of layers were thermocompression-bonded to each other to form the laminate 10. The glass transition temperature Tg (° C.) and the crystallization temperature Tc (° C.) of each of the main solid electrolyte, the positive electrode separation solid electrolyte, and the negative electrode solid separation electrolyte are as shown in Table 1. The ionic conductivity (S/cm) of each of the solid electrolyte layer 13, the positive electrode separation layer 14, and the negative electrode separation layer 15 is as shown in Table 1.

(Formation of Each of Positive Electrode Terminal and Negative Electrode Terminal)

The positive electrode terminal 20 was formed by bonding a silver plate to one side surface of the laminate 10 using a conductive adhesive (thermosetting silver paste manufactured by Daiken Chemical Co., Ltd.), and the negative electrode terminal 30 was formed by bonding a silver plate to the other side surface of the laminate 10 using the conductive adhesive (thermosetting silver paste manufactured by Daiken Chemical Co., Ltd.).

Consequently, the positive electrode terminal 20 and the negative electrode terminal 30 were attached to the laminate 10, so that a solid battery was completed.

Figure 10:
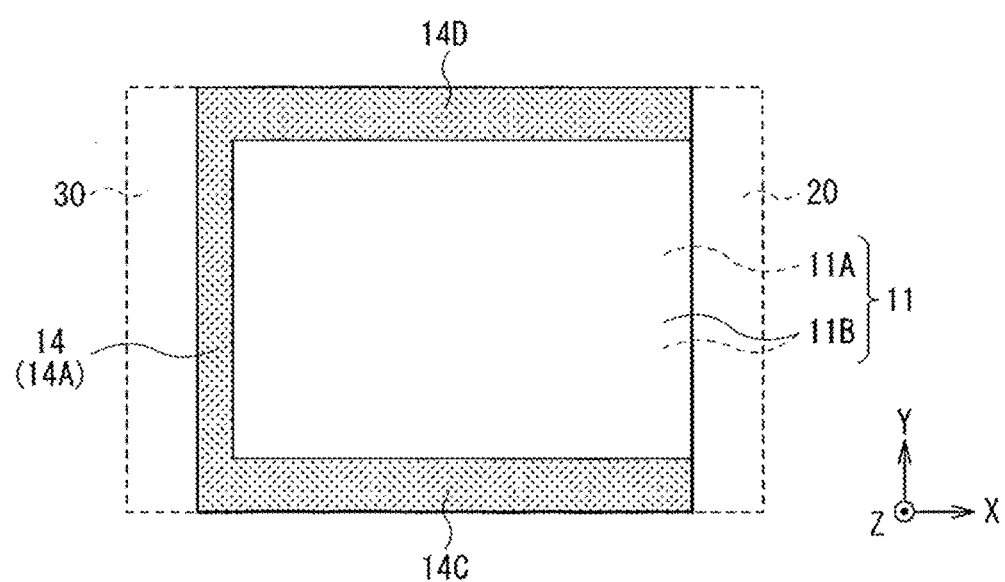
FIG. 10 is a plan view showing respective configurations of the positive electrode layer and the positive electrode separation layer in the modified example.

For comparison, the positive electrode separation layer 14 was formed so as to include the separation portions 14A, 14C, and 14D and not include the separation portion 14B. The column of "spacing" shown in Table 1 shows whether or not the separation portion 14B is formed, that is, whether or not the positive electrode active material layer 11B is spaced apart. When the "spacing" is "present", since the separation portion 14B is formed, the positive electrode active material layer 11B is spaced apart from the positive electrode terminal 20 (FIGS. 2 and 4). On the other hand, when the "spacing" is "absent", since the separation portion 14B is not formed, the positive electrode active material layer 11B is adjacent to the positive electrode terminal 20 (FIGS. 9 and 10).

Subsequently, the charged solid battery was discharged to measure a discharge capacity of the solid battery. At the time of discharging, the solid battery was discharged at a current of 0.1 C until the voltage reached 3.0 V. 0.1 C refers to a current value at which the battery capacity is completely discharged in 10 hours.

Finally, initial efficiency (%) was calculated based on a measurement result of the charge capacity and a measurement result of the discharge capacity, and then a reduction rate (%) of the initial efficiency was calculated. This initial efficiency was calculated using the formula initial efficiency (%)=(discharge capacity/charge capacity)×100. In order to obtain the reduction rate (%), an amount of reduction in the initial efficiency in Experimental Example 7 was set to 100%, and the amount of reduction in the initial efficiency in each of Experimental Examples 1 to 4 was expressed as a percentage.

TABLE 1

| | Positive electrode (negative electrode) separation layer | | | | | | | | | | | |
|---|---|---|---|---|---|---|---|---|---|---|---|---|
| | Positive electrode (negative electrode) separation solid electrolyte | | | | Insulating material | | | | Solid electrolyte layer Main solid electrolyte | | | |
| Experimental Example | Type | Ionic conductivity (S/cm) | Tg (° C.) | Tc (° C.) | Type | Content (% by weight) | Ionic conductivity (S/cm) | Spacing | Type | Ionic conductivity (S/cm) | Tg (° C.) | Tc (° C.) | Reduction rate (%) |
| 1 | Oxide glass B | $10^{-7}$ | 382 | 460 | — | — | $10^{-7}$ | absent | Oxide glass A | $10^{-6}$ | 325 | 393 | 85 |
| 2 | Oxide glass A | $10^{-6}$ | 325 | 393 | aluminum oxide | 50 | $10^{-7}$ | absent | Oxide glass A | $10^{-6}$ | 325 | 393 | 85 |
| 3 | Oxide glass A | $10^{-6}$ | 325 | 393 | aluminum oxide | 50 | $10^{-7}$ | present | Oxide glass A | $10^{-6}$ | 325 | 393 | 75 |
| 4 | Oxide glass A | $10^{-6}$ | 325 | 393 | aluminum oxide | 90 | $10^{-8}$ | present | Oxide glass A | $10^{-6}$ | 325 | 393 | 50 |
| 5 | Oxide glass C | $10^{-8}$ | 430 | 500 | — | — | $10^{-8}$ | absent | Oxide glass A | $10^{-6}$ | 325 | 393 | Incalculable |
| 6 | Oxide glass D | $10^{-10}$ | 193 | 270 | — | — | $10^{-10}$ | absent | Oxide glass A | $10^{-6}$ | 325 | 393 | Incalculable |
| 7 | Oxide glass A | $10^{-6}$ | 325 | 393 | — | — | $10^{-6}$ | absent | Oxide glass A | $10^{-6}$ | 325 | 393 | 100 |

[Evaluation of Solid Battery]

Next, the battery characteristics of the solid battery were evaluated by the procedure described later, and the results shown in Table 1 were obtained. Here, initial charge/discharge characteristics were examined as the battery characteristics.

When the initial charge/discharge characteristics were investigated, first, a lead wire for energization was connected to each of the positive electrode terminal 20 and the negative electrode terminal 30, and then the solid battery was charged to measure a charge capacity of the solid battery. At the time of charging, the solid battery was charged at a current of 0.05 C until the voltage reached 4.35 V, and then further charged at a voltage of 4.35 V until the current reached 0.01 C. 0.05 C refers to a current value at which the battery capacity (theoretical capacity) is completely discharged in 20 hours, and 0.01 C refers to a current value at which the battery capacity is completely discharged in 100 hours.

As shown in Table 1, the initial charge/discharge characteristics varied greatly depending on the configuration of the solid battery.

Hereinafter, a condition in which the glass transition temperature Tg of each of the positive electrode separation solid electrolyte and the negative electrode separation solid electrolyte is set to be lower than the crystallization temperature Tc of the main solid electrolyte is referred to as the "proper condition regarding the glass transition temperature Tg". Further, a condition in which the crystallization temperature Tc of each of the positive electrode separation solid electrolyte and the negative electrode separation solid electrolyte is set to be equal to or higher than the glass transition temperature Tg of the main solid electrolyte is referred to as the "proper condition regarding the crystallization temperature Tc".

Furthermore, a condition in which the ionic conductivity of each of the positive electrode separation layer 14 and the negative electrode separation layer 15 is set to be lower than the ionic conductivity of the solid electrolyte layer 13 is referred to as the "proper condition regarding the ionic conductivity".

Specifically, in a case where although the proper condition regarding the crystallization temperature Tc and the proper condition regarding the ionic conductivity were satisfied, the proper condition regarding the glass transition temperature Tg is not satisfied (Experimental Example 5), each of the positive electrode separation layer 14 and the negative electrode separation layer 15 was not fundamentally sintered, so that a solid battery could not be produced. Thus, the reduction rate could not be calculated.

In a case where although the proper condition regarding the glass transition temperature Tg and the proper condition regarding the ionic conductivity were satisfied, the proper condition regarding the crystallization temperature Tc was not satisfied (Experimental Example 6), each of the positive electrode separation layer 14 and the negative electrode separation layer 15 was sintered, so that a solid battery could be produced. However, since the solid battery was not normally charged/discharged, the reduction rate could not be calculated.

In addition, in a case where although the proper condition regarding the glass transition temperature Tg and the proper condition regarding the crystallization temperature Tc were satisfied, the proper condition regarding the ionic conductivity was not satisfied (Experimental Example 7), each of the positive electrode separation layer 14 and the negative electrode separation layer 15 was sintered, so that a solid battery could be produced. Since the solid battery was normally charged/discharged, the reduction rate could be calculated.

On the other hand, in a case where while the proper condition regarding the glass transition temperature Tg and the proper condition regarding the crystallization temperature Tc were satisfied, the proper condition regarding the ionic conductivity was also satisfied (Experimental Examples 1 to 4), in comparison with the case described above (Experimental Example 7), the reduction rate was significantly reduced, so that the initial efficiency was less likely to be significantly reduced.

In addition to this, in a case where while the proper condition regarding the glass transition temperature Tg and the proper condition regarding the crystallization temperature Tc were satisfied, the proper condition regarding the ionic conductivity was also satisfied (Experimental Examples 1 to 4), there was a tendency described later. First, when the positive electrode separation layer 14 and the negative electrode separation layer 15 each contained an insulating material (Experimental Example 2), even if the ionic conductivity of each of the positive electrode separation solid electrolyte and the negative electrode solid electrolyte was equal to the ionic conductivity of the main solid electrolyte, the ionic conductivity of each of the positive electrode separation layer 14 and the negative electrode separation layer 15 was lower than the ionic conductivity of the solid electrolyte layer 13, so that the reduction rate was sufficiently reduced. Second, when the insulating material was used (Experimental Example 4), as the content of the insulating material was increased, the reduction rate was further reduced. Third, since the positive electrode separation layer 14 includes the separation portion 14B, if the positive electrode active material layer 11B was spaced apart from the positive electrode terminal 20 (Experimental Example 3), the reduction rate was further reduced.

From these facts, in a case where the positive electrode separation layer 14 and the negative electrode separation layer 15 were each formed, when while the proper condition regarding the glass transition temperature Tg and the proper condition regarding the crystallization temperature Tc were satisfied, the proper condition regarding the ionic conductivity was also satisfied, the initial charge/discharge characteristics were improved. Thus, the battery characteristics of the solid battery were improved.

The present technology is described thus far with reference to embodiments and examples thereof; however, aspects of the present technology are not limited to the aspects described in the embodiments and examples above, and can be variously modified. Specifically, although the solid battery using lithium as an electrode reactant has been described, a solid battery using an electrode reactant other than lithium may be used.

It is to be noted that the effects described herein are merely exemplified. Therefore, the effects of the present technology are not limited to the effects described herein. Thus, other effects of the present technology may be obtained.

The invention claimed is:

1. A solid battery comprising:
a positive electrode terminal;
a negative electrode terminal spaced apart from the positive electrode terminal;
a positive electrode layer between the positive electrode terminal and the negative electrode terminal and electrically connected to the positive electrode terminal and spaced apart from the negative electrode terminal;
a negative electrode layer between the positive electrode terminal and the negative electrode terminal and spaced apart from the positive electrode terminal and electrically connected to the negative electrode terminal;
a first solid electrolyte layer between the positive electrode layer and the negative electrode layer and containing a first solid electrolyte; and
a second solid electrolyte layer between at least one of (1) the positive electrode layer and the negative electrode terminal and (2) the negative electrode layer and the positive electrode terminal, the second solid electrolyte layer containing a second solid electrolyte having a glass transition temperature lower than a crystallization temperature of the first solid electrolyte and having a crystallization temperature equal to or higher than a glass transition temperature of the first solid electrolyte, and the second solid electrolyte layer has an ion conductivity lower than an ion conductivity of the first solid electrolyte layer.

2. The solid battery according to claim 1, wherein the second solid electrolyte layer is between the positive electrode layer and the negative electrode terminal and between the negative electrode layer and the positive electrode terminal.

3. The solid battery according to claim 2, wherein the second solid electrolyte has an ionic conductivity lower than an ionic conductivity of the first solid electrolyte.

4. The solid battery according to claim 3, wherein the second solid electrolyte layer further includes an insulating material.

5. The solid battery according to claim 4, wherein the insulating material includes at least one of aluminum oxide, boron nitride, silicon dioxide, silicon nitride, zirconium oxide, aluminum nitride, silicon carbide, and barium titanate.

6. The solid battery according to claim 1, wherein the second solid electrolyte has an ionic conductivity lower than an ionic conductivity of the first solid electrolyte.

7. The solid battery according to claim 6, wherein the second solid electrolyte layer further includes an insulating material.

8. The solid battery according to claim 7, wherein the insulating material includes at least one of aluminum oxide, boron nitride, silicon dioxide, silicon nitride, zirconium oxide, aluminum nitride, silicon carbide, and barium titanate.

9. The solid battery according to claim 1, wherein the second solid electrolyte layer further includes an insulating material.

10. The solid battery according to claim 9, wherein the insulating material includes at least one of aluminum oxide, boron nitride, silicon dioxide, silicon nitride, zirconium oxide, aluminum nitride, silicon carbide, and barium titanate.

11. The solid battery according to claim 1, wherein
the positive electrode layer includes
a positive electrode current collector layer electrically connected to the positive electrode terminal, and
a positive electrode active material layer on the positive electrode current collector layer and spaced apart from the positive electrode terminal, and
an end of the positive electrode active material layer on a side thereof closer to the positive electrode terminal is farther away from the positive electrode terminal than an end of the negative electrode layer on a side thereof closer to the positive electrode terminal.

12. The solid battery according to claim 11, further comprising a third solid electrolyte layer between the positive electrode active material layer and the positive electrode terminal, the third solid electrolyte layer including a third solid electrolyte having a glass transition temperature lower than the crystallization temperature of the first solid electrolyte and having a crystallization temperature equal to or higher than the glass transition temperature of the first solid electrolyte, and the third solid electrolyte layer having an ionic conductivity lower than an ionic conductivity of the first solid electrolyte layer.

13. The solid battery according to claim 12, wherein the third solid electrolyte has an ionic conductivity lower than an ionic conductivity of the first solid electrolyte.

14. The solid battery according to claim 13, wherein the third solid electrolyte layer further includes an insulating material.

15. The solid battery according to claim 14, wherein the insulating material includes at least one of aluminum oxide, boron nitride, silicon dioxide, silicon nitride, zirconium oxide, aluminum nitride, silicon carbide, and barium titanate.

* * * * *